H. HESTAND & J. W. WILLIS.
STALK CUTTER.
APPLICATION FILED FEB. 10, 1908.
904,328.
Patented Nov. 17, 1908.
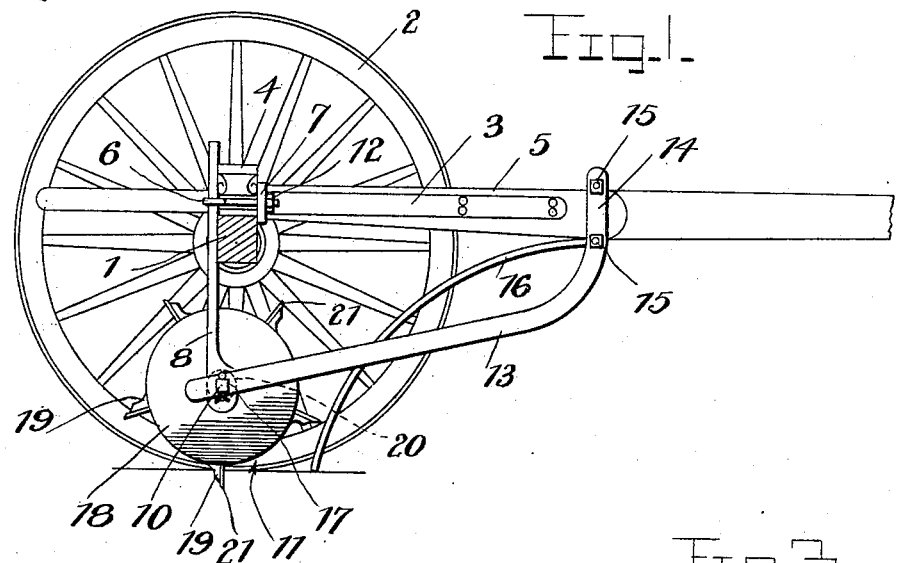
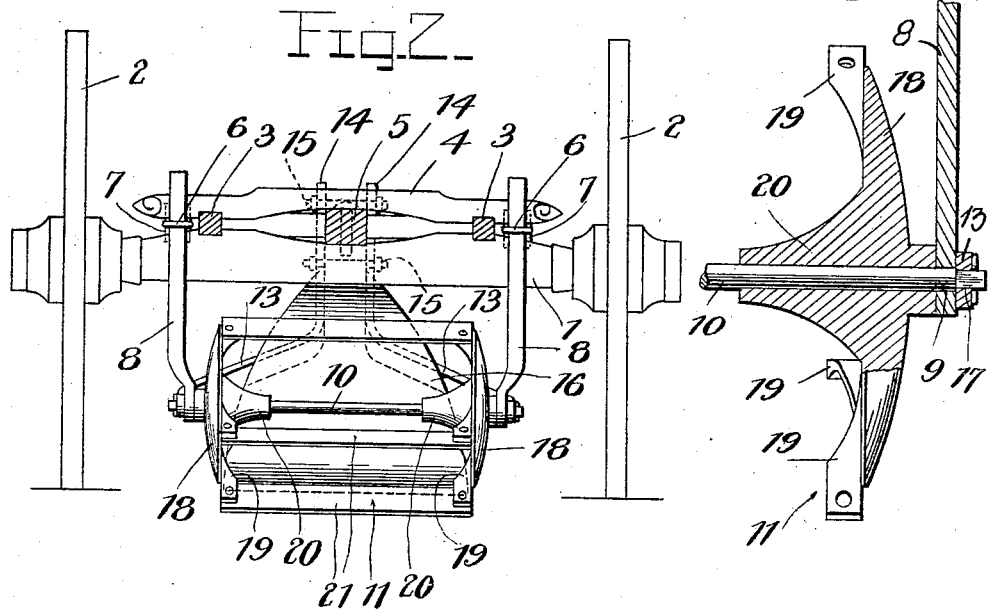
Witnesses
W. H. Rockwell
C. H. Giesbauer
Inventors
Hardy Hestand & J. W. Willis
By H. B. Willson & Co.
Attorneys

UNITED STATES PATENT OFFICE.

HARDY HESTAND AND JOHN W. WILLIS, OF COMANCHE, OKLAHOMA.

STALK-CUTTER.

No. 904,328.

Specification of Letters Patent.

Patented Nov. 17, 1908.

Application filed February 10, 1908. Serial No. 415,218.

*To all whom it may concern:*

Be it known that we, HARDY HESTAND and JOHN W. WILLIS, citizens of the United States, residing at Comanche, in the county of Stephens and State of Oklahoma, have invented certain new and useful Improvements in Stalk-Cutters; and we do declare the following to be a full, clear, and exact description of the invention, such as will enable others skilled in the art to which it appertains to make and use the same.

Our invention relates to stalk choppers, and particularly to that type of chopper used to cut up cotton and corn stalks after their product has been reaped so that they may be turned under and used as fertilizer for the ground.

The object of the invention is to provide a simple, inexpensive device of this character which may be adjusted for different depths of cut and which will be positive in action.

A further object of the invention is the provision of means for adjustably supporting the cutter wheel and for guiding stalks thereto.

A still further object is the provision of means for attaching our stalk chopper to the front running axle of a wagon or other vehicle.

Further objects of the invention will appear as the specific description is read in connection with the accompanying drawings which form a part of this application, and in which, Figure 1 is a side elevation with the near wheel removed; Fig. 2 is a rear view; and Fig. 3 is an enlarged detail section of one of the hubs and supporting arms of the cutter wheel.

Referring more especially to the drawings, 1 represents the axle upon which are mounted the wheels, 2, of the front running gear of a wagon or other suitable vehicle. The hounds or brace rods are shown at 3 and the sand bar at 4. Connected to the brace rods and to the axle by the king bolt is the pole, 5.

Adjustably mounted in a pair of eye bolts, 6, carried by plates, 7, is a pair of vertically depending supporting arms, 8, apertured at their lower ends as at 9 to receive the axle, 10, upon which the chopping roller, 11, is mounted. The eye bolts extend between the sand bar, 4, and the axle, 1, and the supporting bars 8 lie along side both the axle and the sand bar, and are held in engagement therewith by the action of the clamping nut, 12, so that the supporting rods may be raised or lowered as is desired.

Clamped to the tongue forward of the brace rods, 3, is a pair of diverging brace arms, 13, having vertical clamping ends, 14, which are secured one on each side of the pole by bolts, 15. These clamping members carry a rearwardly extending rake, 16, which comprises a solid sheet of material and which is curved and depends to a point adjacent the chopping roller, 11, so that stalks are guided and pressed down in position to be acted upon by the roller. The rear ends of the brace arms, 13, have squared openings in their ends to receive the squared end, 17, of the shaft, 10. This effectually prevents the shaft from turning and allows the chopping wheel to revolve thereon.

The chopper wheel comprises a pair of circular disks, 18, having radially projecting arms, 19, and a central elongated hub, 20, apertured to receive the axle, 10. Bridged between the disks and connected to the arms, 19, is a plurality of cutting blades, 21, which may be lowered by the action of the supporting arms, 8, into engagement with the ground to operate in a well known manner. By loosening the nuts, 12, on the eye bolts, 6, raising or lowering the arms 8 we are enabled to determine the cut of the blades, 21.

Having thus particularly described our invention, what we claim as new, and desire to secure by Letters-Patent, is:

A stalk chopping attachment for the front running gears of wagons which comprises a pair of depending arms adjustably secured to the axle of said running gear and each having an aperture in its lower end, a shaft mounted in the apertures of said arms and having squared outer ends, a stalk cutter journaled on said shaft, a pair of brace arms attached at one end to the pole of said gear and at their opposite ends being provided with squared openings to receive the squared outer ends of said shaft, means to secure the arms on the axle so that they will prevent the same from turning, and a solid rake pivoted to said brace arms and extending closely adjacent the stalk cutter and having a width equal to the cutter.

In testimony whereof we have hereunto set our hands in presence of two subscribing witnesses.

HARDY HESTAND.
JOHN W. WILLIS.

Witnesses:
 WESLEY GANO LOVE,
 ALFRED L. WHITE.